US012361699B2

(12) United States Patent
Lin et al.

(10) Patent No.: US 12,361,699 B2
(45) Date of Patent: Jul. 15, 2025

(54) EFFICIENT NEURAL-NETWORK-BASED PROCESSING OF VISUAL CONTENT

(71) Applicant: QUALCOMM Incorporated, San Diego, CA (US)

(72) Inventors: Jamie Menjay Lin, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 18/150,578

(22) Filed: Jan. 5, 2023

(65) Prior Publication Data

US 2023/0215157 A1 Jul. 6, 2023

Related U.S. Application Data

(60) Provisional application No. 63/266,417, filed on Jan. 5, 2022.

(51) Int. Cl.
*G06V 10/00* (2022.01)
*G06V 10/75* (2022.01)
(Continued)

(52) U.S. Cl.
CPC .............. *G06V 10/82* (2022.01); *G06V 10/75* (2022.01); *G06V 10/77* (2022.01)

(58) Field of Classification Search
CPC ............ G06N 3/02; G06N 3/08; G06N 3/042; G06N 3/045; G06N 3/047; G06N 3/082; G06N 3/092; G06N 3/0454; G06N 3/0475; G06N 3/0464; G06N 20/00; G06N 20/10; G06V 10/82; G06V 10/75; G06V 10/77;
(Continued)

(56) References Cited

U.S. PATENT DOCUMENTS 10,713,755 B2 * 7/2020 Kalchbrenner ....... G06T 3/4053
11,263,753 B2 * 3/2022 Larlus-Larrondo ....... G06T 7/73
(Continued)

OTHER PUBLICATIONS

Li D., "ARVo: Learning All-Range Volumetric Correspondence for Video Deblurring", Computer Vision and Pattern Recognition, Mar. 2021, pp. 7721-7731.
(Continued)

*Primary Examiner* — Amir Alavi
(74) *Attorney, Agent, or Firm* — QUALCOMM Incorporated

(57) ABSTRACT

Certain aspects of the present disclosure provide techniques and apparatus for efficient processing of visual content using machine learning models. An example method generally includes generating, from an input, an embedding tensor for the input. The embedding tensor for the input is projected into a reduced-dimensional space projection of the embedding tensor based on a projection matrix. An attention value for the input is derived based on the reduced-dimensional space projection of the embedding tensor and a non-linear attention function. A match, in the reduced-dimensional space, is identified between a portion of the input and a corresponding portion of a target against which the input is evaluated based on the attention value for the input. One or more actions are taken based on identifying the match.

30 Claims, 5 Drawing Sheets

(51) Int. Cl.
*G06V 10/77* (2022.01)
*G06V 10/82* (2022.01)

(58) Field of Classification Search
CPC ...... G06V 10/50; G06V 10/74; G06V 10/762; G06F 18/23
See application file for complete search history.

(56) References Cited

U.S. PATENT DOCUMENTS

| | | | | |
|---|---|---|---|---|
| 11,270,124 | B1* | 3/2022 | Carvalho | G06V 40/28 |
| 11,620,359 | B2* | 4/2023 | Yan | G06N 3/045 |
| | | | | 382/128 |
| 11,836,467 | B2* | 12/2023 | Allamanis | G06F 8/33 |
| 11,941,373 | B2* | 3/2024 | Deng | G06N 3/084 |
| 11,983,903 | B2* | 5/2024 | Houlsby | G06N 3/084 |
| 12,033,055 | B2* | 7/2024 | Parisotto | G06N 3/044 |
| 12,039,295 | B2* | 7/2024 | Allamanis | G06F 8/33 |
| 12,169,715 | B2* | 12/2024 | Fu | G06N 3/084 |
| 2021/0248476 | A1* | 8/2021 | Fischbacher | G06N 3/084 |
| 2023/0215157 | A1* | 7/2023 | Lin | G06V 10/74 |
| | | | | 382/156 |

OTHER PUBLICATIONS

Teed Z., et al., "RAFT-3D: Scene Flow using Rigid-Motion Embeddings", Computer Vision and Pattern Recognition, Apr. 2021, pp. 8375-8384.

Truong P., et al., "GOCor: Bringing Globally Optimized Correspondence Volumes into Your Neural Network", Computer Vision and Pattern Recognition, NeurIPS 2020, Nov. 2021, pp. 1-13.

Wang S., et al., "Cluster-Former: Clustering-Based Sparse Transformer for Question Answering", ICLR 2021, Mar. 2021, pp. 1-11.

* cited by examiner

EFFICIENT NEURAL-NETWORK-BASED PROCESSING OF VISUAL CONTENT

CROSS-REFERENCE TO RELATED APPLICATIONS

This application claims priority to and benefit of U.S. Provisional Patent Application Ser. No. 63/266,417, entitled "Efficient Neural Network-Based Processing of Visual Content," filed Jan. 5, 2022, and assigned to the assignee hereof, the entire contents of which are hereby incorporated by reference herein.

INTRODUCTION

Aspects of the present disclosure relate to reducing the computational complexity of processing visual content using neural networks.

Generally, processing visual content using machine learning models may be a computationally complex and resource-intensive task. For example, tasks such as optical flow estimation, scene flow estimation, and correspondence estimation may be modeled as quadratic complexity problems in terms of computation and memory demands. That is, the computational complexity (e.g., in terms of processor cycles, memory utilization, etc.) involved in processing these images may be proportional to the square of the size of the images. While the computational complexity of these tasks may be addressed through the use of high performance processing units (e.g., graphics processing units, neural processing units, and/or other processing units that support high degrees of parallelism) and large amounts of memory, edge devices (e.g., user equipments (UEs), such as mobile devices or autonomous vehicles, etc.) may not have sufficient computing resources for processing visual content at a sufficient performance level for the applications in which the processing is to be performed. For example, these edge devices may not have sufficient computing resources to satisfy real-time or near-real-time timing constraints for applications such as autonomous operations (e.g., self-driving cars, movement within constrained environments, etc.).

Accordingly, what is needed are improved techniques for efficiently processing visual content using neural networks.

BRIEF SUMMARY

Certain aspects provide a method for efficient processing of visual content using machine learning models. An example method generally includes generating, from an input, an embedding tensor for the input. The embedding tensor for the input is projected into a reduced-dimensional space projection of the embedding tensor based on a projection matrix. An attention value for the input is derived based on the reduced-dimensional space projection of the embedding tensor and a non-linear attention function. A match, in the reduced-dimensional space, is identified between a portion of the input and a corresponding portion of a target against which the input is evaluated based on the attention value for the input. One or more actions are taken based on identifying the match.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
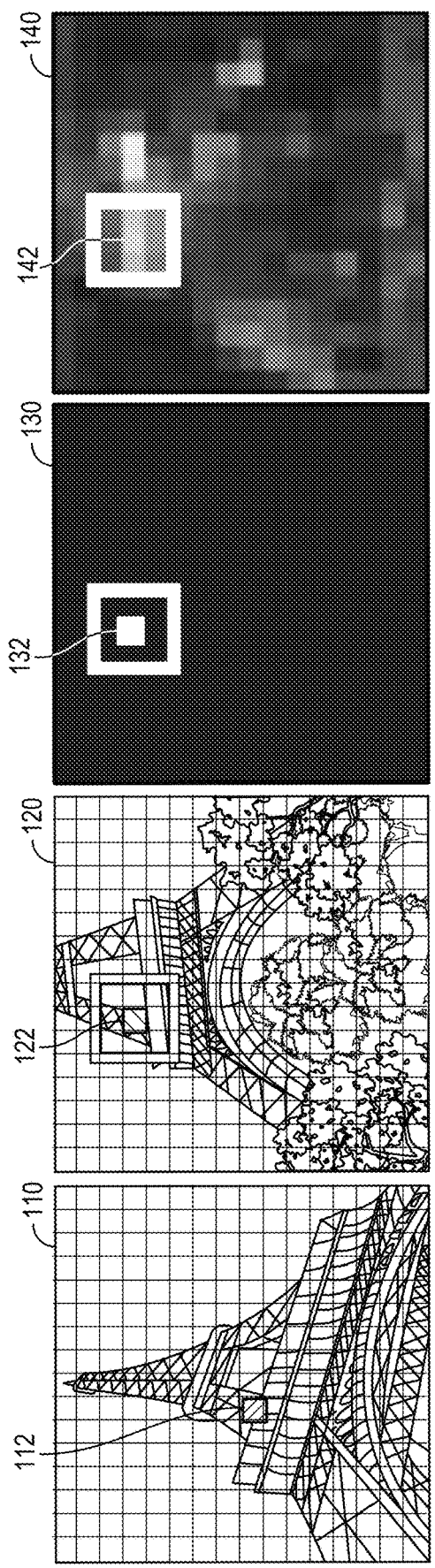
FIG. 1 depicts an example of processing visual content using neural networks.

Aspects of the present disclosure provide techniques and apparatus for efficient processing of visual content using neural networks (e.g., attention-based neural networks).

Various types of neural networks can be used to detect objects in visual content, such as still images or streams of visual content (e.g. video content captured as a series of images at a given frame rate, such as 24 frames per second, 29.97 frames per second, 60 frames per second, etc.). The outputs generated by these networks can be used for various tasks, such as object detection, motion prediction, and the like. For example, neural networks such as convolutional neural networks or transformer neural networks can be used to detect objects in visual content. Based on the detection of various objects in visual content, various actions can be taken depending on the application in which these neural networks are deployed; for example, these actions may include controlling an autonomous vehicle so as to avoid a collision between the autonomous vehicle and objects or obstacles in a scene, controlling a robot to perform a task without the robot or its payload colliding with other objects in a scene, detecting motion or other unexpected activity in a surveilled environment, introducing visual effects in extended reality or mixed reality environments, or the like.

Visual content may be processed based on various techniques in order to trigger various actions on a computing system. For example, neural networks can perform optical flow estimation across frames of video content to estimate motion of various objects within a scene based on the intensity (e.g., the luminance of an object, which may be a single value for greyscale images or values for each of a plurality of color channels for color images (e.g., the red, green, and blue (RGB) channels in images captured using an additive color model)) of objects within these frames, based on the assumption that the color and luminance of an object does not significantly change across different frames. Neural networks can be used to perform scene flow estimation in order to predict the motion of objects within the scene based on previous motion of these objects in prior frames. In still another example, neural networks can be used to perform correspondence estimation between different images in order to identify matching portions of these images.

Generally, the processing of visual content may be a resource-intensive task and may scale approximately quadratically with the spatial resolution of the video content. For example, visual content captured as 1080p resolution (1920 pixels wide by 1080 pixels tall) video with 8-bit color depth in the red, green, and blue (RGB) color channels may result in a frame size of about 6 megabytes per frame; higher-resolution visual content captured in 4K resolution (3840 pixels wide by 2160 pixels tall) and 8-bit color depth may result in a frame size of about 25 megabytes per frame. Because many neural networks process input visual content on a per-segment basis against each segment in a target frame (e.g., each pixel in a frame), the total memory utilization may be represented as the square of the size of the input visual content, and operations may be performed in $O(n^2)$ complexity. Thus, processing two frames of visual content at 1080p resolution may impose an overhead of about 36 megabytes, while processing two frames of visual content at 4K resolution may impose an overhead of about 625 megabytes. In another example, using a transformer neural network to generate a query-key pairing of an image at 1080p resolution, downsampled by a factor of 8, may produce 67 gigabytes of attention data.

For desktop-grade or server-grade computers, there may generally be sufficient compute resources available in order to process the amount of data generated in processing visual content using neural networks. However, for other devices, such as edge devices like smartphones, Internet of Things (IoT) devices, edge processing devices, or the like, the amount of data generated in processing visual content may far exceed the available compute resources on such devices. For example, a processor used in processing visual content with neural networks, such as a neural signal processor (NSP) or neural processing unit (NPU), may organize memory accesses into: (i) accesses to tightly coupled memory (TCM) that is co-located (e.g., in the same package or the same chip) as the NSP or NPU and (ii) accesses to external memory (e.g., caches, volatile or non-volatile random access memory, persistent memory, etc.) using direct memory access (DMA). Accessing TCM is generally a significantly faster operation than accessing external memory using DMA, as TCM is generally located closer to the NSP or NPU and may be configured to satisfy various timing constraints that may not exist for accesses to external memory. However, because these processors may not have a sufficient amount of TCM to store the data generated in processing visual content using a neural network, these processors may continually swap data between external memory and TCM, which may result in delays in processing data until data is swapped between external memory and TCM and an inefficient use of processing cycles and other compute resources (as the processor may execute no-ops until data is swapped from external memory to TCM).

Aspects of the present disclosure provide techniques that allow for efficient processing of visual content using neural networks by sparsifying data in processing visual content. As discussed in further detail herein, sparsifying data may generally include projecting multi-dimensional data into a reduced-dimensional space (or at least a reduced-dimensional space relative to the multi-dimensional data), which may reduce the amount of data to be processed by a neural network to perform various computer vision tasks. Thus, fewer compute resources may be used to complete these computer vision tasks. Because fewer compute resources may be used to complete computer vision tasks, aspects of the present disclosure may reduce the amount of power used by computing devices to perform these tasks and accelerate processing of visual content, relative to the amount of power and time used when processing visual content without sparsifying data. Further, aspects of the present disclosure may allow for visual content to be processed on a wide variety of networked or non-networked devices, including devices with power, processor capability, and/or memory constraints, such as edge devices in a network which may have significantly fewer compute resources than desktop-grade or server-grade computers.

Example Processing of Visual Content Using Neural Networks

FIG. 1 depicts an example 100 of processing visual content using a neural network. In example 100, a reference image 110 and a query image 120 are illustrated as being processed based on correspondence estimation between the reference image 110 and the query image 120. However, it should be recognized that other types of visual content processing may be performed using neural networks.

As illustrated, the reference image 110 and the query image 120 may be segmented into a plurality of segments in order for a neural network to identify a segment in the query image 120 that matches with a given segment in the reference image 110. For example, the reference image 110 and the query image 120 may be partitioned into a grid including a plurality of segments that are significantly smaller in size than the reference image 110 and/or query image 120. In attention-based neural networks that emphasize matching areas and de-emphasize non-matching areas between the reference image 110 and query image 120, a query segment 122 in the query image may be treated as a query, and each segment in the reference image 110 may be treated as a key against which the query is to be compared.

In example 100 illustrated in FIG. 1, a segment in query image 120 is to be matched to a corresponding key segment 112 in reference image 110. In an ideal correlation, illustrated in image 130, a single segment 132 may represent the correlation between the query segment 122 in query image 120 and key segment 112 in reference image 110, as query segment 122 is the only segment in query image 120 that corresponds to key segment 112 in reference image 110. However, a neural network may generate an attention map 140 illustrating potential correlations between key segment 112 and various segments in the query image 120. In attention map 140, darker colors generally correspond to segments of the query image 120 that are less likely to correspond to the key segment 112, while lighter colors generally correspond to segments of the query image 120 that are more likely to correspond to the key segment 112. As illustrated, thus, segment 142 may be identified as a candidate segment, and other segments in query image 120 may also be identified as candidate segments that correspond to the key segment 112.

In generating attention map 140, each segment in the query image 120 may be compared with each segment in the reference image 110. For an image segmented into N segments, each segment may result in N comparisons. Thus, to process an image segmented into N segments, $N^2$ operations may be performed to generate an attention map for the image.

As discussed, performing computer vision tasks such as the correspondence estimation illustrated in FIG. 1 may be a computationally expensive process. Because of the amount of data generated in processing visual content, and because processing units used in processing visual content may have a limited amount of TCM that can be accessed with little processing overhead and low latency, it may not be possible for these processing units to process visual content without significant latency penalties incurred through repeated swapping of data from TCM to external memory via DMA.

Example Key-Query Sparsification for Efficient Processing of Visual Content

To improve the efficiency of neural networks used to process visual content to perform various computer vision tasks, aspects of the present disclosure provide techniques to reduce the computational complexity and memory complexity of computer vision tasks by projecting multi-dimensional data into one or more reduced-dimensional (e.g., linear) spaces. In some aspects, each reduced-dimensional space may correspond to a specific attention head in an attention-based neural network. For example, a two-dimensional input may be projected into two reduced-dimensional spaces, and more generally, an n-dimensional input may be projected into n reduced-dimensional spaces. By projecting multi-dimensional data into a reduced-dimensional space, the amount of computing resources expended in processing visual content may be reduced relative to processing visual content using data in a multi-dimensional space. Computational complexity, size complexity, and the amount of computing resources used in processing visual content may further be reduced through reducing the amount of data against which an input is processed. By reducing the amount of data involved in processing visual content using neural networks, aspects of the present disclosure may reduce the computational complexity and size complexity of such operations to allow for the processing of visual content using the TCM of a processing unit and minimize or eliminate the use of high-latency operations (e.g., DMA) to swap data into the TCM while visual content is being processed.

In attention-based neural networks, an input X may be transformed into an embedding tensor of a plurality of features. Each input feature in the embedding tensor may correspond to a vector of embedding size E. That is, an embedding tensor may be represented as $\{x_i: i=1, 2, \ldots, N\}$, and each feature $x_i$ may be represented according to the equation $x_i = \text{embed}(X)_i \in \mathbb{R}^{E \times 1}$. The target Y against which the input X is compared may also be transformed into an embedding tensor represented as $\{y_i: i=1, 2, \ldots, N\}$, with each feature $y_i$ represented according to the equation $y_i = \text{embed}(Y)_i \in \mathbb{R}^{E \times 1}$.

An attention metric for the features of input X and target Y may be calculated based on the embedding tensors generated for input X and target Y. The attention metric may be calculated according to the equation:

$$\text{Attend}(X,Y) = (\sigma(x_i, y_j))_{i,j \in \{1,2,\ldots,M\}},$$

where σ represents a nonlinear function, such as a softmax function, a sigmoid function, a rectifier linear unit (ReLU) function, or the like. The attention metric for a specific combination of $x_i$ and $y_j$ may be represented according to the equation:

$$\alpha_{i,j} = \sigma(x_i, y_j) = \sigma\left(\frac{x_i^T W_K^T Q_j}{\sqrt{d}}\right),$$

where $x_i^T$ represents a pixel in an input image X, $W_K^T$ represents a set of precomputed weights in a neural network, and $Q_j = (W_Q y_j)$ represents a value derived from a set of weights associated with the target Y and the value of the feature (e.g., pixel) $y_j$ in target Y.

The resulting attention matrix generated for the input X and target Y may thus be represented according to the equation:

AttentionMatrix=$[\sigma(x_i,y_j):i,j\in\{1,2,\ldots,N\}]V_{i,j}=f(W_v,x_i,y_j)$.

That is, the attention matrix may be represented as the product of the attention values generated for each pair of pixels (or segments) $x_i$, $y_j$ in the input X and target Y and a value $V_{i,j}$ derived from a set of weights and the values of $x_i$ and $y_j$. As discussed, generating this attention matrix may be a computationally expensive process, as generating attention values for any specific pixel (or segment) $x_i$ may involve N computations. Thus, generating the attention matrix for input X and target Y may be defined as a process with $O(n^2)$ complexity.

To reduce the complexity involved in generating the attention matrix and thus the complexity of processing visual content using a neural network, aspects of the present disclosure provide techniques for projecting multi-dimensional data, such as the feature tensors generated for input X and target Y, into a reduced-dimensional space. Further, aspects of the present disclosure may sparsify the universe of query data points from target Y that are evaluated to those with a higher likelihood of being relevant in processing the input X, which may further improve the efficiency of visual content processing using neural networks.

Figure 2:
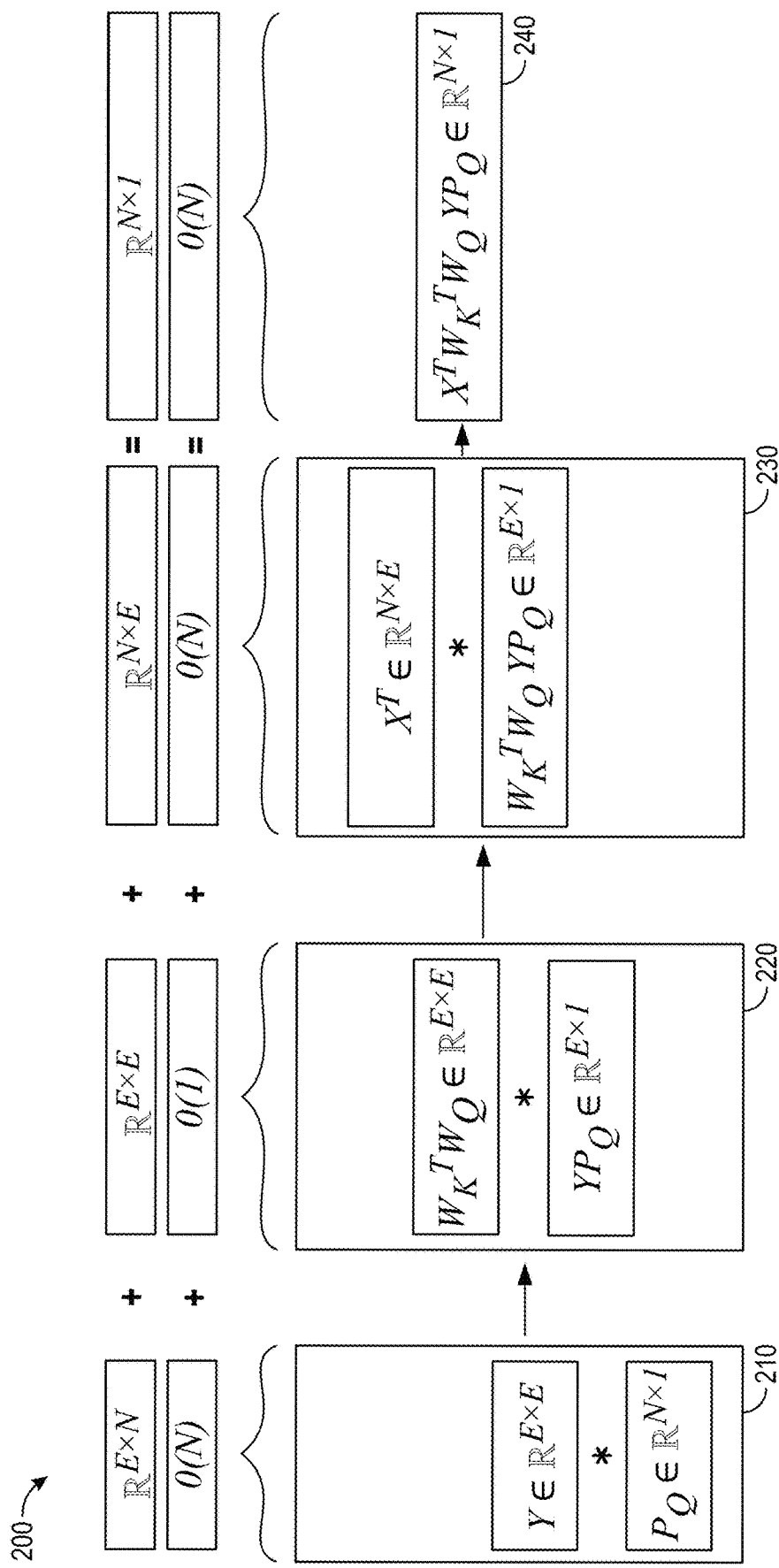
FIG. 2 depicts an example pipeline for efficient processing of visual content using a neural network and key-query sparsification, according to aspects of the present disclosure.

FIG. 2 illustrates an example pipeline 200 for processing visual content using a neural network and key-query sparsification and the computational expense of processing visual content using a neural network and key-query sparsification. As illustrated, pipeline 200 includes a first stage 210, second stage 220, and third stage 230.

In first stage 210, a target Y is reduced from data in a multi-dimensional space into data in a reduced-dimensional space. To do so, assume that target Y (or an embedding tensor generated from target Y) has dimensions of E×N (e.g., $Y \in \mathbb{R}^{E \times N}$), and a trainable linear query projection $P_Q$ has dimensions of N×1 (e.g., $P_Q \in \mathbb{R}^{N \times 1}$). E generally may represent the embedding size for embeddings generated for input X and target Y, and N may generally represent the number of elements in input X and target Y. The trainable linear query projection $P_Q$ generally represents a structure that projects the global contributions of query points in the target Y. Generally, the projection $P_Q$ may emphasize (e.g., assign higher weights or importance) query points in the target Y that are likely to correspond to items of interest (e.g., foreground content, objects that are moving in a scene, etc.) and deemphasize query points in the target Y that are less likely to correspond to items of interest (e.g., background content, the sky, etc.). Because target Y and linear query projection $P_Q$ are both matrices, the properties of matrix multiplication allow for the generation of a projection of target Y that has dimensions of E×1 (e.g., the generation of a reduced-dimensional matrix, also referred to as a vector). This projection of target Y into a reduced-dimensional matrix may result in the product $YP_Q$. Generating this reduced-dimensional matrix may thus be an operation that has computational complexity and size complexity of O(N).

In second stage 220, the reduced-dimensional space projection of Y, represented as $YP_Q \in \mathbb{R}^{E \times 1}$ may be multiplied by the product of sets of weights $W_K^T$ and $W_Q$. As discussed, $W_K^T$ represents a set of precomputed weights in a neural network, and $Q_j=(W_Q y_j)$ represents a value derived from a set of weights associated with the target Y and the value of the pixel $y_j$. The product $W_K^T W_Q$ may be a matrix with dimensions of E×E and may be precomputed. Because $W_K^T W_Q$ may be precomputed, multiplying the reduced-dimensional space projection of Y by $W_K^T W_Q$ may be a constant time operation having computational complexity and size complexity of O(1). The resulting product, $W_K^T W_Q Y P_Q$, may thus be a matrix having dimensions of E×1 and may represent a weighted reduced-dimensional space projection of Y.

At third stage 230, an attention value for the input $X^T \in \mathbb{R}^{N \times E}$ may be generated using the weighted reduced-dimensional space projection of Y generated at second stage 220. Input $X^T$ may have dimensions of N× E, and as discussed, the weighted reduced-dimensional space projection of Y may be a matrix having dimensions of E×1. Multiplying input $X^T$ by the weighted reduced-dimensional space projection of Y may have a computational complexity and size complexity of O(N) and result in the generation of output 240, which may be an N×1 linear projection of input $X^T$ and target Y represented by the equation $X^T W_K^T W_Q Y P_Q$. In total, the computational complexity and size complexity of projecting input $X^T$ and target Y into a reduced-dimensional space may be represented as O(N), as the computational expense of first stage 210, second stage 220, and third stage 230 is additive and not multiplicative. That is, first stage 210, second stage 220, and third stage 230 are performed once for a given input $X^T$ rather than multiple times. Because the projection of an input $X^T$ and target Y into a reduced-dimensional space can be performed with O(N) complexity, significant reductions in compute resource utilization (e.g., processor cycle utilization and memory utilization) may be achieved by projecting input $X^T$ and target Y into a reduced-dimensional space from a two-dimensional space.

Thus, based on the pipeline 200, an attention metric $\alpha_i$ for the $i^{th}$ segment of an input $X^T$ may be represented according to the equation:

$$\text{AttendMetric: } \alpha_i \triangleq \sigma(x_i, y_{\{j:j \in G\}}) = \sigma\left(\frac{x_i^T W_K^T W_Q Y P_Q}{\sqrt{d}}\right) \in R, i \in G,$$

where G={1, 2, . . . , N} and Y={$y_i$: j∈ G}. In some aspects, the trainable linear query projection $P_Q$ may be refined into a subset such that i∈ G' ⊂ G. Refining the trainable linear query projection $P_Q$ into a subset may further reduce the amount of memory used to calculate the attention metric α for each segment of input X.

In some aspects, further reductions in the computational complexity of processing visual content using a neural network may be achieved by sparsifying target Y to a subset of the keys in target Y. By sparsifying target Y to a subset of the keys in target Y, the computational complexity and memory complexity involved in processing visual content may be further reduced to a non-linear function with less complexity than a linear projection of the input X and target Y discussed above. To sparsify the keys in target Y, key tokens may be selected according to various resource constraints of the computing system on which a neural network is deployed. These resource constraints may be, for example, an available amount of TCM that can be allocated for processing visual content using a neural network, computational complexity, in-memory complexity, or the like. The sparsification of the trainable linear projection may, for example, be based on an evaluation of the attention metric $\alpha_i$ for each individual key token i and may be selected based on a thresholded sigmoid metric, a thresholded softmax metric, a thresholded ReLU output, top-M selection, or other techniques that can be used to sparsify the keys in target Y.

For example, to sparsify the target key set, the attention metrics α531 $\mathbb{R}^{N \times 1}$ can be generated for tokens in the input, and the tokens associated with the highest values of a may be selected. Using the top M tokens as an example, a key set K may be generated as $K_{\{i:i \in S\}}^T = (x_i^T W_K^T)_{\{i:i \in S\}} \in \mathbb{R}^{M \times E}$ where i∈ S ⊂ G represents indices i corresponding to the sparsification function and $K_{\{i:i \in S\}}^T$ is a reduced matrix from $K_{\{i:i \in S\}}^T \in \mathbb{R}^{N \times E}$. The indices i may, for example, correspond to the indices associated with the M highest attention metric values in the set of attention metrics α generated for the input X and target Y. M may be, for example, a defined number or a number generated based on a defined percentage of the overall number of keys in $K_{\{i:i \in S\}}^T \in \mathbb{R}^{N \times E}$.

Based on the sparsification of the key tokens into the reduced set of tokens, an attention matrix may be generated by computing attention values according to the equation:

$$\text{Attend}(X, Y)_{i \in S, j \in G} = (\sigma(x_i, y_j))_{i \in S, j \in G} = \sigma\left(\frac{x_i^T W_K^T Q_j}{\sqrt{d}}\right)_{\{i:i \in S\}} \in \mathbb{R}^{M \times N}.$$

The resulting attention matrix may be represented according to the equation:

$$\text{AttentionMatrix} = [\sigma(x_i, y_j): i, j \in \{1, 2, \ldots, N\}]$$
$$V_{i,j} \in R^{M \times N}.$$

In some aspects, using the values $V_{i,j}$ may be optional. If used, $V_{i,j}$ may be based on the same criteria as that used for the sparsification of the key tokens. That is, the indices i used to calculate $V_{i,j}$ may be i∈ S ⊂ G and correspond to the indices associated with the highest M attention metric values, the indices of tokens having calculated metrics (e.g., softmax metrics, sigmoid metrics, ReLU output, etc.) exceeding a threshold, or the like.

Figure 3:
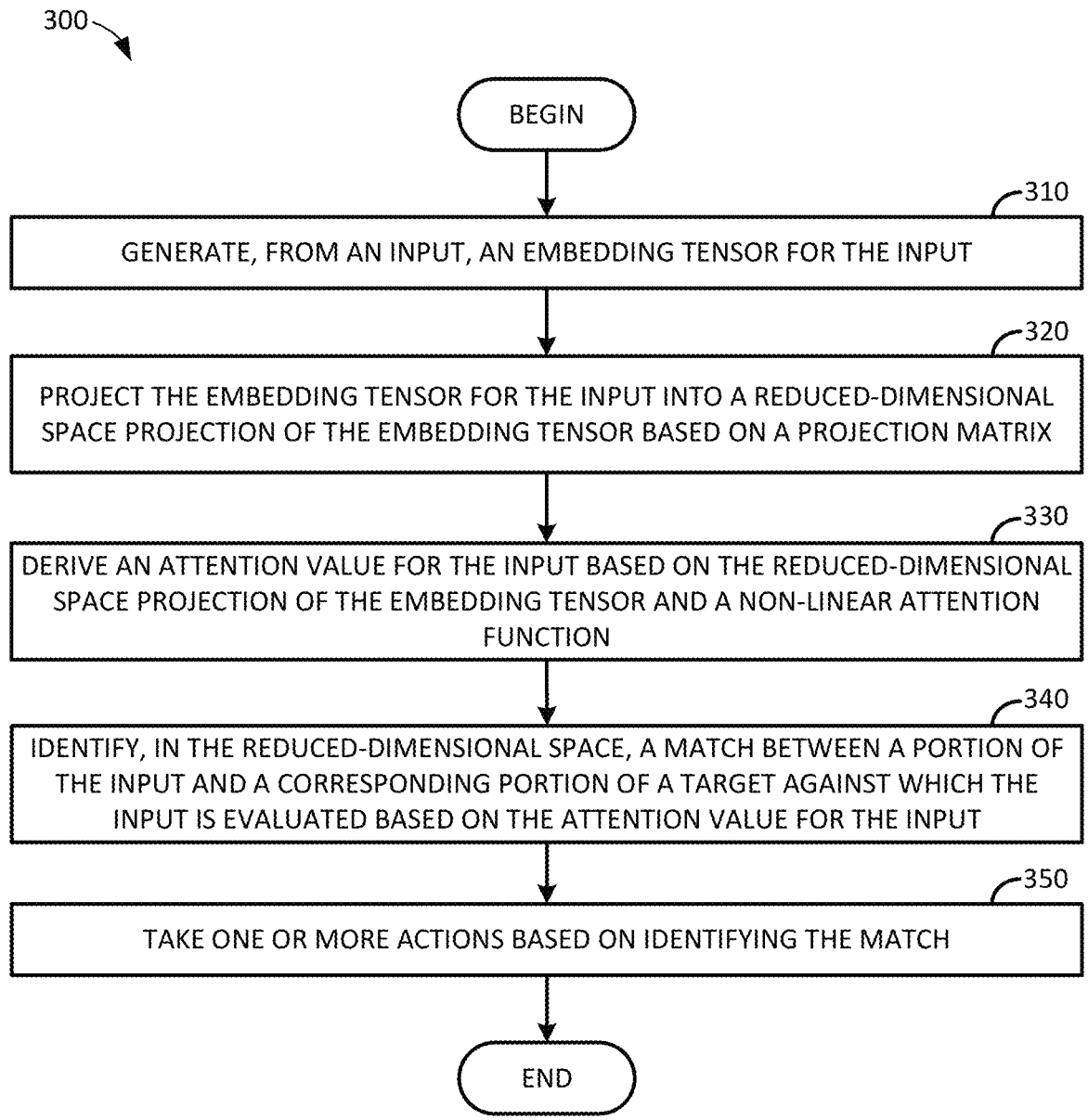
FIG. 3 depicts example operations for efficient processing of visual content using a neural network and key-query sparsification, according to aspects of the present disclosure.

FIG. 3 illustrates example operations 300 for efficient processing of visual content using a neural network and key-query sparsification, according to aspects of the present disclosure. Operations 300 may be performed, for example, by a computing device on which one or more artificial neural networks are deployed for use in various computer vision tasks, such as system 500 illustrated in FIG. 5. These computing devices may include, for example and without limitation, user equipments (UEs) in a wireless communication network, autonomous vehicles, IoT devices, other edge processing devices in a wireless communication network, or the like.

As illustrated, operations 300 begin at block 310, where an embedding tensor is generated for an input X, discussed above with respect to FIG. 2. The embedding tensor may be generated using an artificial neural network and may be a multi-dimensional array of data representing the input. For example, for an image received as an input, the embedding tensor may be a two-dimensional array having the dimensions of the input image, and each element in the embedding tensor may be an embedding value associated with a pixel in the image. In another example, the embedding tensor may be a two-dimensional array having dimensions smaller than the dimensions of the input image, and each element in the embedding tensor may be an embedding value associated with a group of pixels in the image.

At block 320, the embedding tensor for the input X is projected into a reduced-dimensional space projection of the embedding tensor based on a projection matrix, $P_Q$. For example, the reduced-dimensional space projection of the embedding tensor may be one or more reduced-dimensional space projections of the embedding tensor. Generally, the projection matrix may be a trained projection over a global set of locations in a spatial network. The projection matrix may be trained in advance for use in projecting the global contributions of query points in an input into a reduced-dimensional space. In some aspects, the projection matrix may be a subset of locations from the global set of locations in the spatial network. That is, for a global set of locations G in the spatial network, the projection matrix $P_Q$ may include a set of locations G', where G'∈G. Generally, by reducing the size of the projection matrix to a subset of locations in the global set of locations G, the computational complexity and memory complexity involved in processing visual content using neural networks may be further reduced.

In some aspects, to project the embedding tensor into the reduced-dimensional space, multiple products may be calculated. A first product may be calculated based on the embedding tensor for the target Y and the projection matrix $P_Q$ (e.g., the first product may equal $Y \times P_Q$). A second product may be calculated based on the first product and a set of weights $W_K^T W_Q$ (e.g., the second product may equal $W_K^T W_Q \times Y \times P_Q$). Finally, a third product may be calculated based on the embedding tensor for the input X and the second product (e.g., the third product may equal $X \times W_K^T W_Q \times Y \times P_Q$).

For an embedding tensor for the input with dimensions of E×N, the projection matrix may have a size of N×1. As discussed, E generally corresponds to an embedding size, and N corresponds to a number of elements in input X and target Y (assuming that input X and target Y have the same dimensions). When the embedding tensor for the input is multiplied by the projection matrix, the resulting projection of the embedding tensor may be a reduced-dimensional matrix with dimensions of E×1. The set of weights $W_K^T W_Q$ may be a matrix with dimensions of E×E. When multiplying the set of weights $W_K^T W_Q$ by the first product, the resulting product, representing a weighted version of the embedding tensor for the target Y, may be a matrix with dimensions of E×1. Finally, for an embedding tensor for an input X having dimensions of N× E, multiplying this embedding tensor by the weighted version of the embedding tensor for the target Y may result in a reduced-dimensional space projection of the embedding tensor for the input X having a size of N×1.

At block 330, an attention value α for the input X is derived based on the reduced-dimensional space projection of the embedding tensor (e.g., based on $X \times W_K^T W_Q \times Y \times P_Q$) and a non-linear attention function σ. The non-linear attention function, σ, may be, for example, a softmax function, a sigmoid function, a ReLU function, or the like. In some aspects, the attention value for the input may be an attention matrix with attention values associated with each element in the attention matrix. The elements in the attention matrix may, for example, correspond to pixels in an input image, segments of pixels in the input image, or the like. The attention value generally corresponds to a measure of correspondence between a query token in the input and key tokens in the target. Higher values may generally indicate that a query token in the input is more likely to correspond to a given key token in the target, while lower values may generally indicate that a query token in the input is less likely to correspond to a given key token in the target. Query tokens in the input and key tokens in the target may correspond to discrete elements in the input and the target.

At block 340, a match is identified, in the reduced-dimensional space projection, between a portion of the input and a corresponding portion of a target against which the input is evaluated based on the attention value for the input. Generally, in identifying a match in the reduced-dimensional space, the attention value for each element may be examined. Elements with attention values exceeding a threshold value may be considered potential matches between the portion of the input and the portion of the target, while elements with attention values below the threshold value may not be considered potential matches. In some aspects, a match may be identified as the element in the reduced-dimensional space having a highest attention value. In some aspects, a match may also or alternatively be identified based on the attention values of surrounding elements in the reduced-dimensional space.

At block 350, one or more actions are taken based on the match. In one example, where the input and the target are images in a scene, the images may be processed based on identifying the match between the portion of the input image and the corresponding portion of the target image. Processing the images may include, for example, detecting an object in the input image based on identifying the match, detecting or predicting the motion of objects in the input image, or the like. The output of such processing may be used, for example, in various tasks, such as autonomous control of vehicles or other mechanical devices (e.g., robotic arms), anomaly detection in images, or the like. In other examples, the input and target may be other spatial-temporal data, such as audio data in which the input and target are portions of audio clips to identify matching portions of a target and input audio clip.

In some aspects, the complexity involved in processing visual content using neural networks may further be reduced by sparsifying the set of key tokens in a target against which elements in an input are compared. To sparsify the set of key tokens, a set of key tokens may be selected from an embedding tensor for the target Y based on the attention value for the input X. Generally, key token sparsification may be performed subsequent to processing one or more input images through a neural network and prior to processing a different image through the neural network (e.g., after performing operations 300 with respect to a first input and prior to performing operations 300 with respect to a subsequent second input). An attention matrix may be generated for the input based on the reduced-dimensional space projection of the embedding tensor for input X, the non-linear attention function σ, and the selected set of key tokens K. Because the selected set of key tokens is generally a subset of the key tokens generated for the target Y, the computational complexity of processing visual content may be reduced relative to processing visual content using the global set of tokens generated for the target Y, as key tokens that are unlikely to be relevant for inference or other purposes may be omitted from the sparsified set of key tokens.

The key tokens included in the sparsified set of key tokens may generally comprise key tokens from the embedding tensor for the target with appearance in the attention matrix exceeding a threshold value. That is, the key tokens that appear most often in the attention matrix may be considered the most relevant key tokens for use in processing inputs against the target and may thus be included in the set of key tokens, while other key tokens may be considered less relevant or irrelevant and may be omitted in processing inputs against the target. The threshold value, which may be a proxy for the number of key tokens included in the sparsified set of key tokens, may be selected based on various metrics.

One example metric may include the amount of tightly coupled memory (TCM) associated with a processor available for inference operations. Generally, the number of tokens in the sparsified set of key tokens may be directly proportional to the amount of TCM available for inference operations, and the threshold value may be inversely proportional to the number of tokens in the sparsified set of key tokens. Another example metric may be a value selected based on an amount of change detected between successive inputs. Generally, where there is little to no change between successive inputs, the static nature of the environment in which visual content is being processed may call for a smaller number of key tokens in the sparsified set. However, more key tokens may be used as the amount of change detected between successive inputs increases, as the successive inputs may represent significantly different scenes.

In some aspects, further reductions in computational complexity may be achieved by reducing the extent of an input that is processed. For example, for correspondence estimation in flow estimation problems, processing portions of an input that have changed may replace the key token sparsification discussed above. To reduce the extent of an input that is processed, masks may be used that focus on the portions of the input that have changed relative to a previous input and de-emphasize or ignore portions of the input that have remained static. Using these masks, the embedding tensor for the input may be generated on the masked portion of the input (where the mask corresponds to the portions of an input that have changed relative to a previous input) or the inverse of the masked portion of the input (where the mask corresponds to portions of the input that have remained static relative to the previous input).

Aspects of the present disclosure may, for example, allow for visual content to be processed using TCM associated with a processor. Because the computational complexity and memory complexity involved in processing visual content may be a linear function (e.g., performed using O(N) processing time and memory utilization), visual content may be processed using TCM of a processor alone. Data generated in processing visual content using linear projections and key-query sparsification may fit within TCM, and because this data fits within TCM, DMA operations to external system memory may not be needed in order to process visual content using the techniques discussed herein. Processing visual content using TCM associated with a processor without invoking DMA operations to external system memory may provide various improvements in the efficiency of visual content processing operations. For example, processing visual content using TCM associated with a processor without invoking DMA operations to external system memory may reduce latency involved in processing visual content, minimize (or at least reduce) the number of process cycles wasted while waiting for memory to be swapped from external system memory to the TCM associated with a processor, reduce power utilization, and reduce the amount of time taken to process visual content using neural networks. Further, as discussed below, aspects of the present disclosure may allow for just-in-time processing of visual content, which may allow for devices on which visual content is processed to rapidly react to changes in the environment in which these devices operate.

Figure 4:
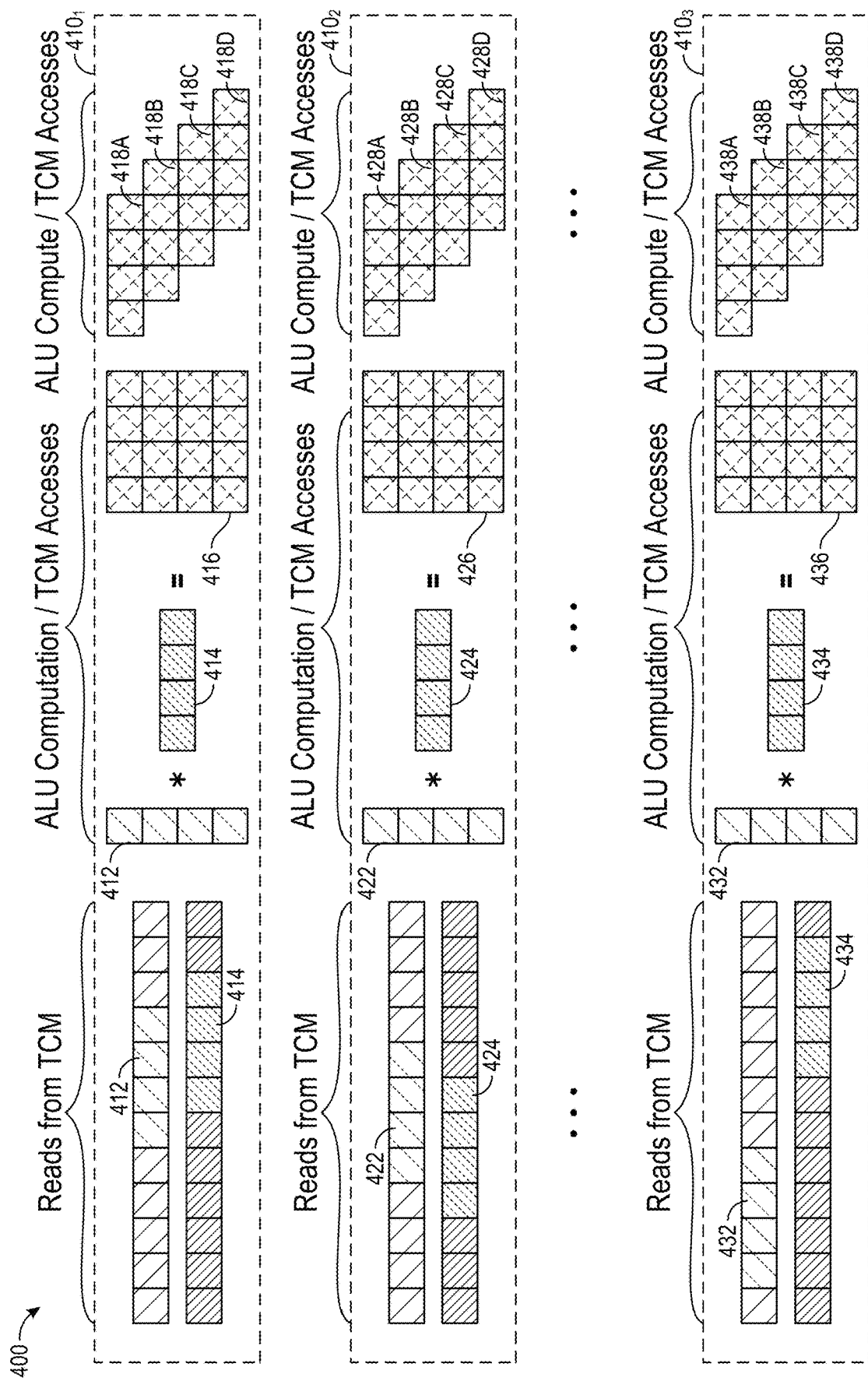
FIG. 4 depicts an example of memory accesses in efficient processing of visual content using a neural network and key-query sparsification, according to aspects of the present disclosure.

FIG. 4 illustrates an example 400 of memory accesses in efficient processing of visual content using neural networks and key-query sparsification, according to aspects of the present disclosure. As illustrated in example 400, operations may be performed by performing operations with respect to data in TCM of a processor and may not involve the high-latency process of DMA to external system memory. Because operations may be performed with respect to data in TCM of a processor, just-in-time processing of visual content may be achieved.

In each of operations 4101, 4102, and 410*n*, blocks of data may be read from TCM. Operations 4101, 4102, and 410*n* may, in some aspects, be iterations of multiply-and-accumulate (MAC) and/or just-in-time (JIT) operations performed with respect to blocks of data associated with an input X and a target Y. For example, memory blocks 412, 422, 432 may represent blocks of data associated with an input X, and memory blocks 414, 424, 434 may represent blocks of data associated with a target Y. In operation 4101, memory blocks 412 and 414 may be input into an arithmetic logic unit (ALU) for computation (e.g., multiplication), and the output of the ALU computation may be a matrix with dimensions based on the size of memory blocks 412 and 414.

For example, as illustrated in operation 4101, a data block 412 may be sized as a 4×1 matrix, and a data block 414 may be sized as a 1×4 matrix, resulting in the generation of a matrix 416 with dimensions of 4×4. In some aspects, because each row of this matrix 416 may be generated sequentially, separate TCM accesses may be performed for each row 418A through 418D. Because the inputs of memory blocks 412 and 414 (along with the other contents of input X and target Y) and the data generated by performing operations on memory blocks 412 and 414 are generally small enough to fit within TCM, DMA to external system memory may not be needed.

Operations 4102 and 410*n* may similarly be performed on the respective memory blocks 422, 424, 432, 434 and outputs 428, 438 based on matrices 426, 436 by accessing TCM and without performing DMA to external system memory. Because such operations may be performed by accessing TCM, aspects of the present disclosure may allow for just-in-time processing of visual content.

Figure 5:
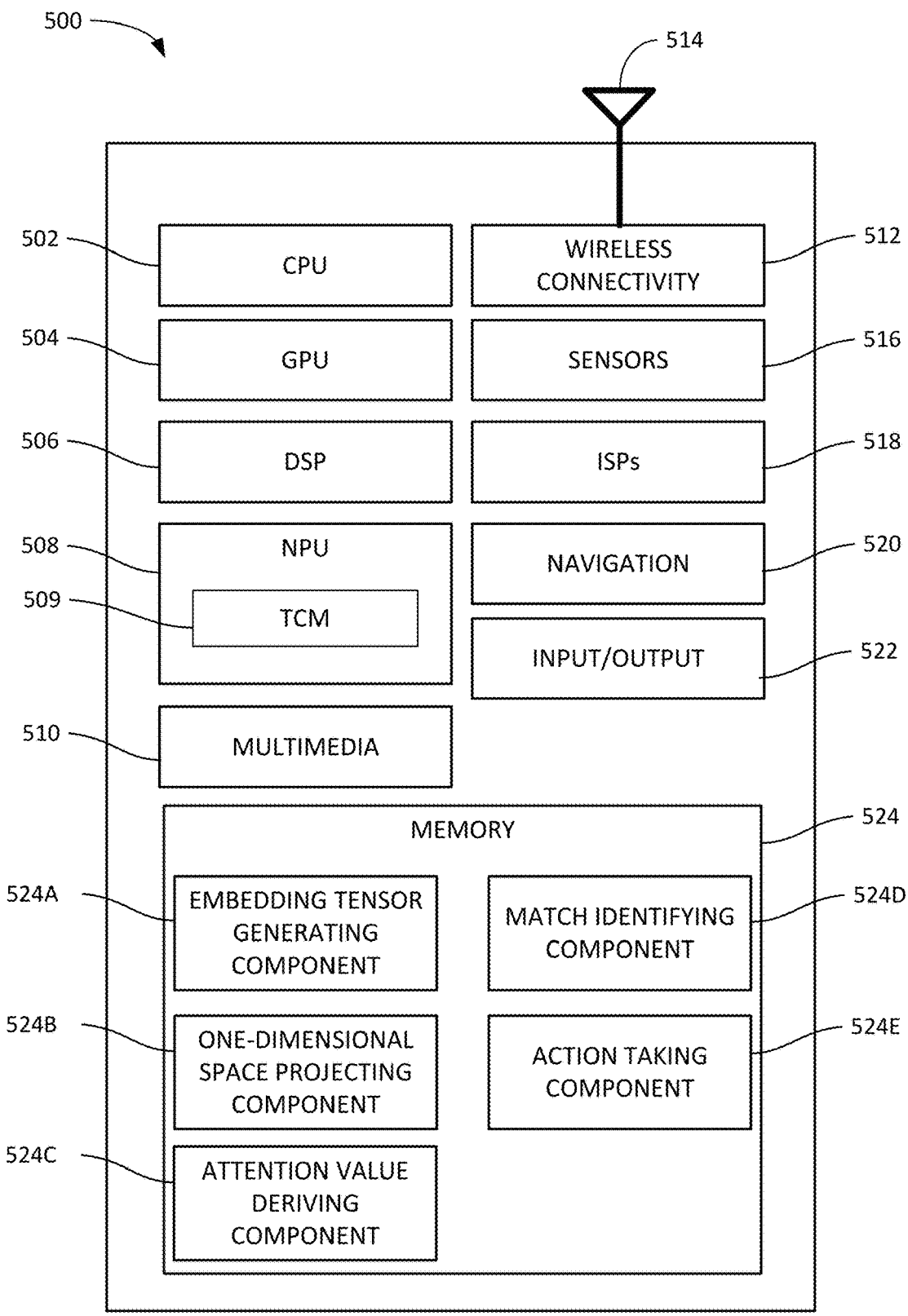
FIG. 5 depicts an example implementation of a device on which efficient processing of visual content using a neural network and key-query sparsification can be performed, according to aspects of the present disclosure.

Example Processing System for Efficient Processing of Visual Content Using Neural Networks and Key-Query Sparsification FIG. 5 depicts an example processing system 500 for various computer vision tasks (e.g., correspondence estimation, optical flow estimation, scene flow estimation, classification, etc.) using neural networks and key-query sparsification, such as described herein for example with respect to FIG. 3.

Processing system 500 includes a central processing unit (CPU) 502, which in some examples may be a multi-core CPU. Instructions executed at the CPU 502 may be loaded, for example, from a program memory associated with the CPU 502 or may be loaded from a memory 524.

Processing system 500 also includes additional processing components tailored to specific functions, such as a graphics processing unit (GPU) 504, a digital signal processor (DSP) 506, a neural processing unit (NPU) 508, a multimedia processing unit 510, and a wireless connectivity component 512.

An NPU, such as NPU 508, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as NPUs 508, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process the new piece of data through an already trained model to generate a model output (e.g., an inference).

As illustrated, NPU 508 includes TCM 509 associated therewith. As discussed, the data generated while processing visual content through NPU 508 using the techniques discussed herein may be stored in TCM 509, which may have low memory access latency relative to memory 524. While NPU 508 is illustrated as including TCM 509 associated therewith, it should be recognized that other processing units that can be used to process visual content using neural networks, such as CPU 502, GPU 504, DSP 506, or the like, may also include a TCM associated therewith.

In one implementation, NPU 508 is a part of one or more of CPU 502, GPU 504, and/or DSP 506.

In some examples, wireless connectivity component 512 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 512 is further connected to one or more antennas 514.

Processing system 500 may also include one or more sensor processing units 516 associated with any manner of sensor, one or more image signal processors (ISPs) 518 associated with any manner of image sensor, and/or a navigation component 520, which may include satellite-based positioning system components (e.g., GPS or GLONASS) as well as inertial positioning system components.

Processing system 500 may also include one or more input and/or output devices 522, such as screens, touch-sensitive surfaces (including touch-sensitive displays), physical buttons, speakers, microphones, and the like.

In some examples, one or more of the processors of processing system 500 may be based on an ARM or RISC-V instruction set.

Processing system 500 also includes memory 524, which is representative of one or more static and/or dynamic memories, such as a dynamic random access memory, a flash-based static memory, and the like. In this example, memory 524 includes computer-executable components, which may be executed by one or more of the aforementioned processors of processing system 500.

In particular, in this example, memory 524 includes embedding tensor generating component 524A, reduced-dimensional space projecting component 524B, attention value deriving component 524C, match identifying component 524D, and action taking component 524E. The depicted components, and others not depicted, may be configured to perform various aspects of the methods described herein.

Generally, processing system 500 and/or components thereof may be configured to perform the methods described herein.

Notably, in other aspects, elements of processing system 500 may be omitted, such as where processing system 500 is a server computer or the like. For example, multimedia processing unit 510, wireless connectivity component 512, sensor processing units 516, ISPs 518, and/or navigation component 520 may be omitted in other aspects. Further, aspects of processing system 500 may be distributed, such as training a model and using the model to generate inferences, such as user verification predictions.

Example Clauses

Implementation details of various aspects of the present disclosure are described in the following numbered clauses.

Clause 1: A method, comprising: generating, from an input, an embedding tensor for the input; projecting the embedding tensor for the input into a reduced-dimensional space projection of the embedding tensor based on a projection matrix; deriving an attention value for the input based on the reduced-dimensional space projection of the embedding tensor and a non-linear attention function; identifying, in the reduced-dimensional space projection, a match between a portion of the input and a corresponding portion of a target against which the input is evaluated based on the attention value for the input; and taking one or more actions based on identifying the match.

Clause 2: The method of Clause 1, wherein the projection matrix comprises a trained projection over a global set of locations in a spatial network.

Clause 3: The method of Clause 1 or 2, wherein projecting the embedding tensor for the input into the reduced-dimensional space projection of the embedding tensor comprises: calculating a first product based on an embedding tensor for the target and the projection matrix; calculating a second product based on a set of weights and the first product; and calculating a third product based on the embedding tensor for the input and the second product.

Clause 4: The method of Clause 3, wherein the embedding tensor for the target comprises a matrix having dimensions of a number of elements in the target by an embedding size, and the projection matrix comprises a matrix having dimensions of a number of elements in the target by 1.

Clause 5: The method of Clause 3 or 4, wherein the set of weights comprises a weight matrix having dimensions of an embedding size by the embedding size, and the first product comprises a matrix having dimensions of the embedding size by 1.

Clause 6: The method of any of Clauses 3 through 5, wherein the embedding tensor for the input comprises a matrix having dimensions of a number of elements in the input by an embedding size, and the second product comprises a matrix having dimensions of the embedding size by 1.

Clause 7: The method of any of Clauses 3 through 6, wherein the set of weights comprise a trained set of weights for a neural network.

Clause 8: The method of any of Clauses 1 through 7, further comprising: selecting, based on the attention value for the input, a set of tokens from an embedding tensor for the target; and generating an attention matrix for the input based on the reduced-dimensional space projection of the embedding tensor for the input and the non-linear attention function and on the selected set of tokens.

Clause 9: The method of Clause 8, wherein the set of tokens comprises tokens from the embedding tensor for the target with appearances in the attention matrix exceeding a threshold value.

Clause 10: The method of Clause 9, wherein the threshold value comprises a value selected based on an amount of tightly coupled memory associated with a processor available for inference operations.

Clause 11: The method of Clause 9 or 10, wherein the threshold value comprises a value selected based on an amount of change detected between successive inputs.

Clause 12: The method of any of Clauses 1 through 11, further comprising identifying a portion of the input that has changed relative to a previous input, wherein generating the embedding tensor for the input comprises generating the embedding tensor based on the identified portion of the input.

Clause 13: The method of any of Clauses 1 through 12, wherein the input comprises an input image and the target comprises a target image.

Clause 14: The method of Clause 13, wherein taking one or more actions based on identifying the match comprises processing the input image based on the identifying the match.

Clause 15: The method of Clause 13 or 14, wherein taking one or more actions based on identifying the match comprises detecting an object in the input image based on identifying the match.

Clause 16: The method of any of Clauses 1 through 15, wherein the identifying the match is performed using tightly coupled memory associated with a processor without direct memory access to system memory.

Clause 17: The method of any of Clauses 1 through 16, wherein the projection matrix comprises a linear projection matrix.

Clause 18: The method of any of Clauses 1 through 17, wherein the projection matrix comprises a matrix including a subset of elements from a global set of elements associated with the target.

Clause 19: A processing system comprising: a memory comprising computer-executable instructions and one or more processors configured to execute the computer-executable instructions and cause the processing system to perform a method in accordance with any of Clauses 1-18.

Clause 20: A processing system, comprising means for performing a method in accordance with any of Clauses 1-18.

Clause 21: A non-transitory computer-readable medium comprising computer-executable instructions that, when executed by one or more processors of a processing system, cause the processing system to perform a method in accordance with any of Clauses 1-18.

Clause 22: A computer program product embodied on a computer-readable storage medium comprising code for performing a method in accordance with any of Clauses 1-18.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method, comprising:
   generating, from an input, an embedding tensor for the input;
   projecting the embedding tensor for the input into a reduced-dimensional space projection of the embedding tensor based on a projection matrix;
   deriving an attention value for the input based on the reduced-dimensional space projection of the embedding tensor and a non-linear attention function;
   identifying, in the reduced-dimensional space projection, a match between a portion of the input and a corresponding portion of a target against which the input is evaluated based on the attention value for the input; and
   taking one or more actions based on identifying the match.

2. The method of claim 1, wherein the projection matrix comprises a trained projection over a global set of locations in a spatial network.

3. The method of claim 1, wherein projecting the embedding tensor for the input into the reduced-dimensional space projection of the embedding tensor comprises:
   calculating a first product based on an embedding tensor for the target and the projection matrix;
   calculating a second product based on a set of weights and the first product; and
   calculating a third product based on the embedding tensor for the input and the second product.

4. The method of claim 3, wherein the embedding tensor for the target comprises a matrix having dimensions of a number of elements in the target by an embedding size, and wherein the projection matrix comprises a matrix having dimensions of a number of elements in the target by 1.

5. The method of claim 3, wherein the set of weights comprises a weight matrix having dimensions of an embedding size by the embedding size, and wherein the first product comprises a matrix having dimensions of the embedding size by 1.

6. The method of claim 3, wherein the embedding tensor for the input comprises a matrix having dimensions of a number of elements in the input by an embedding size, and wherein the second product comprises a matrix having dimensions of the embedding size by 1.

7. The method of claim 3, wherein the set of weights comprises a trained set of weights for a neural network.

8. The method of claim 1, further comprising:
   selecting, based on the attention value for the input, a set of tokens from an embedding tensor for the target; and
   generating an attention matrix for the input based on the reduced-dimensional space projection of the embedding tensor for the input and the non-linear attention function and on the selected set of tokens.

9. The method of claim 8, wherein the set of tokens comprises tokens from the embedding tensor for the target with appearances in the attention matrix exceeding a threshold value.

10. The method of claim 9, wherein the threshold value comprises a value selected based on an amount of tightly coupled memory associated with a processor available for inference operations.

11. The method of claim 9, wherein the threshold value comprises a value selected based on an amount of change detected between successive inputs.

12. The method of claim 1, further comprising identifying a portion of the input that has changed relative to a previous input, wherein generating the embedding tensor for the input comprises generating the embedding tensor based on the identified portion of the input.

13. The method of claim 1, wherein the input comprises an input image and wherein the target comprises a target image.

14. The method of claim 13, wherein taking one or more actions based on identifying the match comprises processing the input image based on identifying the match.

15. The method of claim 13, wherein taking one or more actions based on identifying the match comprises detecting an object in the input image based on identifying the match.

16. The method of claim 1, wherein identifying the match is performed using tightly coupled memory associated with a processor without direct memory access to system memory.

17. The method of claim 1, wherein the projection matrix comprises a linear projection matrix.

18. The method of claim 1, wherein the projection matrix comprises a matrix including a subset of elements from a global set of elements associated with the target.

19. A system, comprising:
   a memory having computer-executable instructions stored thereon; and
   a processor configured to execute the computer-executable instructions in order to cause the system to:
   generate, from an input, an embedding tensor for the input;
   project the embedding tensor for the input into a reduced-dimensional space projection of the embedding tensor based on a projection matrix;
   derive an attention value for the input based on the reduced-dimensional space projection of the embedding tensor and a non-linear attention function;
   identify, in the reduced-dimensional space projection, a match between a portion of the input and a corresponding portion of a target against which the input is evaluated based on the attention value for the input; and
   take one or more actions based on identifying the match.

20. The system of claim 19, wherein in order to project the embedding tensor for the input into the reduced-dimensional space projection of the embedding tensor, the processor is configured to cause the system to:

calculate a first product based on an embedding tensor for the target and the projection matrix;

calculate a second product based on a set of weights and the first product; and calculate a third product based on the embedding tensor for the input and the second product.

21. The system of claim 19, wherein the processor is further configured to cause the system to:

select, based on the attention value for the input, a set of tokens from an embedding tensor for the target; and generate an attention matrix for the input based on the reduced-dimensional space projection of the embedding tensor for the input and the non-linear attention function and on the selected set of tokens.

22. The system of claim 19, wherein the processor is further configured to cause the system to identify a portion of the input that has changed relative to a previous input, and wherein in order to generate the embedding tensor for the input, the processor is configured to cause the system to generate the embedding tensor based on the identified portion of the input.

23. The system of claim 19, wherein the input comprises an input image and the target comprises a target image.

24. The system of claim 23, wherein in order to take one or more actions based on identifying the match, the processor is configured to cause the system to process the input image based on identifying the match.

25. The system of claim 23, wherein in order to take one or more actions based on identifying the match, the processor is configured to cause the system to detect an object in the input image based on identifying the match.

26. The system of claim 19, wherein identifying the match is performed using tightly coupled memory associated with processor without direct memory access to system memory.

27. The system of claim 19, wherein the projection matrix comprises a linear projection matrix.

28. The system of claim 19, wherein the projection matrix comprises a matrix including a subset of elements from a global set of elements associated with the target.

29. A system, comprising:

means for generating, from an input, an embedding tensor for the input;

means for projecting the embedding tensor for the input into a reduced-dimensional space projection of the embedding tensor based on a projection matrix;

means for deriving an attention value for the input based on the reduced-dimensional space projection of the embedding tensor and a non-linear attention function;

means for identifying, in the reduced-dimensional space projection, a match between a portion of the input and a corresponding portion of a target against which the input is evaluated based on the attention value for the input; and means for taking one or more actions based on identifying the match.

30. A computer-readable medium having instructions stored thereon which, when executed by a processor, perform an operation comprising:

generating, from an input, an embedding tensor for the input;

projecting the embedding tensor for the input into a reduced-dimensional space projection of the embedding tensor based on a projection matrix;

deriving an attention value for the input based on the reduced-dimensional space projection of the embedding tensor and a non-linear attention function;

identifying, in the reduced-dimensional space projection, a match between a portion of the input and a corresponding portion of a target against which the input is evaluated based on the attention value for the input; and taking one or more actions based on identifying the match.

* * * * *